(12) United States Patent
Jacobsen et al.

(10) Patent No.: US 7,452,948 B2
(45) Date of Patent: Nov. 18, 2008

(54) SUPPORTED POLYMERISATION CATALYSTS

(75) Inventors: Grant Berent Jacobsen, Bouc-Bel-Air (FR); Brian Stephen Kimberley, Bouche du Rhone (FR); Sergio Mastroianni, Martigues (FR); Michael John Taylor, Middlesex (GB)

(73) Assignee: Ineos Europe Limited, Hampshire (GB)

( * ) Notice: Subject to any disclaimer, the term of this patent is extended or adjusted under 35 U.S.C. 154(b) by 228 days.

(21) Appl. No.: 10/525,035

(22) PCT Filed: Aug. 14, 2003

(86) PCT No.: PCT/GB03/03573

§ 371 (c)(1),
(2), (4) Date: Feb. 17, 2005

(87) PCT Pub. No.: WO2004/020487

PCT Pub. Date: Mar. 11, 2004

(65) Prior Publication Data

US 2005/0255988 A1    Nov. 17, 2005

(30) Foreign Application Priority Data

Aug. 29, 2002    (EP) .................. 02358021

(51) Int. Cl.
*C08F 4/649*    (2006.01)
*C08F 4/642*    (2006.01)
*C08F 4/76*    (2006.01)
*B01J 31/38*    (2006.01)

(52) U.S. Cl. ............. 526/160; 526/170; 526/161; 526/172; 526/134; 526/129; 526/130; 526/348; 526/348.5; 526/348.6; 526/348.2; 526/351; 526/352; 526/943; 526/901; 502/118

(58) Field of Classification Search ........... 526/160, 526/161, 130, 348.5, 129, 170, 75, 127, 172, 526/943, 901, 348.2, 348.6, 351, 352, 134; 502/103, 104, 118, 152

See application file for complete search history.

(56) References Cited

U.S. PATENT DOCUMENTS

| 4,169,926 | A | * | 10/1979 | McDaniel | ............. 526/106 |
| 5,595,827 | A | * | 1/1997 | Yamada et al. | ............. 428/516 |
| 5,767,032 | A | * | 6/1998 | Hokkanen et al. | ......... 502/108 |
| 6,184,170 | B1 | | 2/2001 | Chang | |
| 6,225,423 | B1 | * | 5/2001 | Andell et al. | ............. 526/75 |

FOREIGN PATENT DOCUMENTS

| WO | WO 97/44371 A1 | * | 5/1997 |
| WO | WO 97/27224 | | 7/1997 |
| WO | WO 00/015672 A1 | * | 3/2000 |

OTHER PUBLICATIONS

Kamfjord, et al., "Supported metallocene catalysts prepared by impregnation of MAO modified silica by a metallocene/monomer solution", Macromolecular Rapid Communications, 19, No. 10, pp. 505-509, (1998).

Rytter, et al., "Supported Metallocene Catalysts Prepared by Impregnation of Silica with Metallocene/Aluminoxane/1-Hexene Solutions", Macromolecular Rapid Communications, 22, No. 17, pp. 1427-1431, (2001).

* cited by examiner

*Primary Examiner*—Vasu Jagannathan
*Assistant Examiner*—Rip A. Lee
(74) *Attorney, Agent, or Firm*—Finnegan, Henderson, Farabow, Garrett and Dunner, L.L.P.

(57) ABSTRACT

An improved method for the preparation of a supported polymerisation catalyst system comprises the combination of (i) a porous support (ii) a polymerisable monomer, (iii) a polymerisation catalyst, and (iv) a cocatalyst, characterised in that the polymerisable monomer is added to the porous support before addition of one or both of the polymerisation catalyst and the cocatalyst. The preferred polymerisation catalyst is a metallocene complex and the preferred porous support is silica. The resultant supported catalysts are stable over long periods of time. The supported catalyst are particularly suitable for use in the gas phase.

26 Claims, No Drawings

SUPPORTED POLYMERISATION CATALYSTS

The present invention relates to supported catalysts suitable for the polymerisation of olefins and in particular to supported metallocene catalysts providing advantages for operation in gas phase processes for the polymerisation of ethylene or the copolymerisation of ethylene and α-olefins having from 3 to 10 carbon atoms.

In recent years there have been many advances in the production of polyolefin homopolymers and copolymers due to the introduction of metallocene catalysts. Metallocene catalysts offer the advantage of generally a higher activity than traditional Ziegler catalysts and are usually described as catalysts which are single site in nature. There have been developed several different families of metallocene complexes. In earlier years catalysts based on bis (cyclopentadienyl) metal complexes were developed, examples of which may be found in EP 129368 or EP 206794. More recently complexes having a single or mono cyclopentadienyl ring have been developed. Such complexes have been referred to as 'constrained geometry' complexes and examples of these complexes may be found in EP 416815 or EP 420436. In both of these complexes the metal atom eg. zirconium is in the highest oxidation state.

Other complexes however have been developed in which the metal atom may be in a reduced oxidation state. Examples of both the bis (cyclopentadienyl) and mono (cyclopentadienyl) complexes have been described in WO 96/04290 and WO 95/00526 respectively.

The above metallocene complexes are utilised for polymerisation in the presence of a cocatalyst or activator. Typically activators are aluminoxanes, in particular methyl aluminoxane or alternatively may be compounds based on boron compounds. Examples of the latter are borates such as trialkyl-substituted ammonium tetraphenyl- or tetrafluorophenyl-borates or triarylboranes such as tris(pentafluorophenyl) borane. Catalyst systems incorporating borate activators are described in EP 561479, EP 418044 and EP 551277.

The above metallocene complexes may be used for the polymerisation of olefins in solution, slurry or gas phase. When used in the slurry or gas phase the metallocene complex and/or tile activator are suitably supported. Typical supports include inorganic oxides eg. silica or polymeric supports may alternatively be used.

Examples of the preparation of supported metallocene catalysts for tile polymerisation of olefins may be found in WO 94/26793, WO 95/07939, WO 96/00245, WO 96/04318, WO 97/02297 and EP 642536.

WO 98/27119 describes supported catalyst components comprising ionic compounds comprising a cation and an anion in which the anion contains at least one substituent comprising a moiety having an active hydrogen. In this disclosure supported metallocene catalysts are exemplified in which the catalyst is prepared by treating the aforementioned ionic compound with a trialkylaluminium compound followed by subsequent treatment with the support and the metallocene.

WO 98/27119 also describes a method for activating a substantially inactive catalyst precursor comprising (a) an ionic compound comprising a cation and an anion containing at least one substituent comprising a moiety having an active hydrogen, (b) a +transition metal compound and optionally, (c) a support by treatment with an organometallic compound thereby forming an active catalyst:

Various methods have been utilised to prepare supported catalysts of this type. For example WO 98/27119 describes several methods of preparing the supported catalysts disclosed therein in which the support is impregnated with the ionic compound. The volume of the ionic compound may correspond from 20 volume percent to greater than 200 volume percent of the total pore volume of the support. In a preferred preparative route the volume of the solution of the ionic compound does not exceed substantially, and is preferably equal to, the total pore volume of the support. Such methods of preparation may be referred to as incipient precipitation or incipient wetness techniques.

U.S. Pat. No. 6,458,904 describes the preparation of supported metallocene catalysts by contacting a metallocene complex with an alk-1-ene followed by reaction of this mixture with an ionic compound followed by addition to a support material.

U.S. Pat. No. 6,225,423 describes the reaction product of a transition metal compound with an unsaturated organic compound such as 1-hexene and wherein the reaction product is then contacted in a suitable solvent with a carrier material.

U.S. Pat. No. 5,912,202 describes the contact between a single site catalyst precursor with an activating cocatalyst before, during or after contact of the single site precursor with a weakly coordinating electron donor that does not substantially polymerise during the contacting stage.

Macromolecular Rapid Communications 1998, 19. 505-509 describes the preparation of a number of silica supported metallocene catalysts. Exemplified systems described the addition of a metallocene/1-hexene solution to a silica supported aluminoxane or the addition of a metallocene to silica supported aluminoxane followed by addition of 1-hexene.

More recently Macromolecular Rapid Communications 2001, 22, 1427-1431 described the preparation of supported metallocene catalysts by impregnating up to the pore volume of a silica support with a premixed 1-hexene solution of co- and pro-catalysts. Exemplified systems were silica supported bis(cyclopentadienyl) zirconium dichloride/methyl aluminoxane for slurry polymerisation. Such systems however showed no long term storage stability and after a few days were inactive for polymerisations.

In both these latter prior art references the addition of the 1-hexene is either after both the polymerisation catalyst (eg. metallocene) and cocatalyst (aluminoxane) have been added to the support or wherein the polymerisation catalyst and cocatalyst are contacted simultaneously with the 1-hexene and the support.

We have now surprisingly found that the addition of a polymerisable monomer to the support prior to Contact with one or both of the polymerisation catalyst and the cocatalyst results in an improved supported catalyst system which has improved activity and which is stable over extended periods of time.

Thus according to the present invention there is provided a method for the preparation of a supported polymerisation catalyst system said method comprising the combination of (i) a porous support (ii) a polymerisable monomer, (iii) a polymerisation catalyst, and (iv) a cocatalyst, characterised in that the polymerisable monomer is added to the porous support before addition of one or both of the polymerisation catalyst and the cocatalyst:

A preferred method according to the present invention comprises the following steps:
(i) addition of a cocatalyst to a porous support,
(ii) addition of a polymerisable monomer, and
(iii) addition of a polymerisation catalyst.

Other suitable orders of addition according to the present invention include the following:
support, polymerisation catalyst, monomer and cocatalyst
support, monomer, cocatalyst and polymerisation catalyst, or
support, monomer, polymerisation catalyst and cocatalyst.

The polymerisable monomer may be added to the porous support at 0.01 to 2 times the pore volume of the support.

In the preferred embodiment the polymerisable monomer is added to the porous support at less than or equal to the pore volume of the support.

Suitable porous support materials include inorganic metal oxides or alternatively polymeric supports may be used for example polyethylene, polypropylene, clays, zeolites, etc.

The most preferred support material for use with the supported catalysts according to the method of the present invention is silica. Suitable silicas include Ineos ES70 and Grace Davison 948 silicas.

The support material may be subjected to a heat treatment and/or chemical treatment to reduce the water content or the hydroxyl content of the support material. Typically chemical dehydration agents are reactive metal hydrides, aluminium alkyls and halides. Prior to its use the support material may be subjected to treatment at 100° C. to 1000° C. and preferably at 200 to 850° C. in an inert atmosphere under reduced pressure.

The porous supports are preferably pretreated with an organometallic compound preferably an organoaluminium compound and most preferably a trialkylaluminium compound in a dilute solvent.

The support material is pretreated with the organometallic compound at a temperature of $-20°$ C. to $150°$ C. and preferably at $20°$ C. to $100°$ C.

Polymerisable monomers suitable for use in the method of the present invention include ethylene, propylene, 1-butene, 1-hexene, 1-octene, 1-decene, styrene, butadiene, and polar monomers for example vinyl acetate, methyl methacrylate, etc. Preferred monomers are ethylene, propylene, 1-butene or 1-hexene.

Alternatively a combination of one or more monomers may be used for example ethylene/1-hexene.

The preferred polymerisable monomer for use in the present invention is 1-hexene.

The polymerisable monomer is suitably used in liquid form or alternatively may be used in a suitable solvent.

When using a liquid monomer it may be advantageous that the catalyst components be optionally present in a solution of the polymerisable monomer for example when using 1-hexene as solvent.

The polymerisable monomer and polymerisation catalyst are typically used in a ratio of 1:1 to 250:1 and most preferably in the ratio 20:1 to 80:1.

The polymerisation catalyst component according to the present invention may suitably be any polymerisation catalyst used in conjunction with a porous support in the present of a suitable cocatalyst.

The polymerisation catalyst may typically be a transition metal compound of Groups IIIA to IIB of the Periodic Table of Elements (IUPAC Version). Examples of such transition metal compounds are traditional Ziegler Natta, vanadium and Phillips-type catalysts well known in the art.

The traditional Ziegler Natta catalysts include transition metal compounds from Groups IVA-VIA, in particular catalysts based on titanium compounds of formula $MR_x$ where M is titanium and R is halogen or a hydrocarbyloxy group and x is the oxidation state of the metal. Such conventional type catalysts include $TiCl_4$, $TiBr_4$, $Ti(OEt)_3Cl$, $Ti(OEt)_2Br_2$ and similar. Traditional Ziegler Natta catalysts are described in more detail in "Ziegler-Natta Catalysts and Polymerisation" by J. Boor, Academic Press, New York, 1979.

Vanadium based catalysts include vanadyl halides eg. $VCl_4$, and alkoxy halides and alkoxides such as $VOCl_3$, $VOCl_2(OBu)$, $VCl_3(OBu)$ and similar.

Conventional chromium catalyst compounds referred to as Phillips type catalysts include $CrO_3$, chromocene, silyl chromate and similar and are described in U.S. Pat. No. 4,124,532, U.S. Pat. No. 4,302,565.

Other conventional transition metal compounds are those based on magnesium/titanium electron donor complexes described for example in U.S. Pat. No. 4,302,565.

Other suitable transition metal compounds are those based on the late transition metals (LTM) of Group VIII for example compounds containing iron, nickel, manganese, ruthenium, cobalt or palladium metals. Examples of such compounds are described in WO 98/27124 and WO 99/12981 and may be illustrated by [2,6-diacetylpyridinebis(2,6-diisopropylanil) $FeCl_2$], 2.6-diacetylpyridinebis (2,4,6-trimethylanil) $FeCl_2$ and [2,6-diacetylpyridinebis(2,6-diisopropylanil)$COCl_2$].

Other catalysts include derivatives of Group IIIA, IVA or Lanthanide metals which are in the +2, +3 or +4 formal oxidation state. Preferred compounds include metal complexes containing from 1 to 3 anionic or neutral ligand groups which may be cyclic or non-cyclic delocalized π-bonded anionic ligand groups. Examples of such π-bonded anionic ligand groups are conjugated or non-conjugated, cyclic or non-cyclic dienyl groups, allyl groups, boratabenzene groups, phosphole and arene groups. By the term π-bonded is meant that the ligand group is bonded to the metal by a sharing of electrons from a partially delocalised π-bond.

Each atom in the delocalized π-bonded group may independently be substituted with a radical selected from the group consisting of hydrogen, halogen, hydrocarbyl, halohydrocarbyl, hydrocarbyl, substituted metalloid radicals wherein the metalloid is selected from Group IVB of the Periodic Table. Included in the term "hydrocarbyl" are C1-C20 straight, branched and cyclic alkyl radicals, C6-20 aromatic radicals, etc. In addition two or more such radicals may together form a fused ring system or they may form a metallocycle with the metal.

Examples of suitable anionic, delocalised π-bonded groups include cyclopentadienyl, indenyl, fluorenyl, tetrahydroindenyl, tetrahydrofluorenyl, octahydrofluorenyl, etc. as well as phospholes and boratabenzene groups.

Phospholes are anionic ligands that are phosphorus containing analogues to the cyclopentadienyl groups. They are shown in the art and described in WO 98/50392.

The boratabenzenes are anionic ligands that are boron containing analogues to benzene. They are known in the art and are described in Organometallics, 14, 1, 471-480 (1995).

The preferred polymerisation catalyst of the present invention is a bulky ligand compound also referred to as a metallocene complex containing at least one of the aforementioned delocalized π-bonded group, in particular cyclopentadienyl ligands. Such metallocene complexes are those based on Group IVB metals for example titanium, zirconium and hafnium.

Metallocene complexes may be represented by the general formula:

LxMQn where L is a cyclopentadienyl ligand, M is a Group IVB metal, Q is a leaving group and x and n are dependent upon the oxidation state of the metal.

Typically the Group IVB metal is titanium, zirconium or hafnium, x is either 1 or 2 and typical leaving groups include halogen or hydrocarbyl. The cyclopentadienyl ligands may be substituted for example by alkyl or alkenyl groups or may comprise a fused ring system such as indenyl or fluorenyl.

Examples of suitable metallocene complexes are disclosed in EP 1293618 and EP 206794. Such complexes may be unbridged eg. bis(cyclopentadienyl) zirconium dichloride, bis(pentamethyl)cyclopentadienyl dichloride, or may be bridged eg. ethylene bis(indenyl) zirconium dichloride or dimethylsilyl(indenyl) zirconium dichloride.

Other suitable bis(cyclopentadienyl) metallocene complexes are those bis(cyclopentadienyl) diene complexes described in WO 96/04290. Examples of such complexes are bis(cyclopentadienyl) zirconium (2.3-dimethyl-1,3-butadiene) and ethylene bis(indenyl) zirconium 1,4-diphenyl butadiene.

Examples of monocyclopentadienyl or substituted monocyclopentadienyl complexes suitable for use in the present invention are described in EP 416815, EP 418044, EP 420436 and EP 551277. Suitable complexes may be represented by the general formula:

CpMX$_n$ wherein Cp is a single cyclopentadienyl or substituted cyclopentadienyl group optionally covalently bonded to M through a substituent, M is a Group IVB metal bound in a $\eta^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with cP forms a metallocycle with M and n is dependent upon the valency of the metal.

Particularly preferred monocyclopentadienyl complexes have the formula:

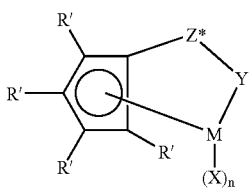

wherein:
R' each occurrence is independently selected from hydrogen, hydrocarbyl, silyl, germyl, halo, cyano, and combinations thereof, said R' having up to 20 non-hydrogen atoms, and optionally, two R' groups (where R' is not hydrogen, halo or cyano) together form a divalent derivative thereof connected to adjacent positions of the cyclopentadienyl ring to form a fused ring structure;
X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms,
Y is —O—, —S—, —NR*—, —PR*—,
M is hafnium, titanium or zirconium,
Z* is SiR*$_2$, CR*$_2$, SiR*$_2$SIR*$_2$, CR*$_2$CR*$_2$, CR*=CR*, CR*$_2$SIR*$_2$, or
GeR*$_2$, wherein:
R* each occurrence is independently hydrogen, or a member selected from hydrocarbyl, silyl, halogenated alkyl, halogenated aryl, and combinations thereof, said
R* having up to 10 non-hydrogen atoms, and optionally, two R* groups from Z* (when R* is not hydrogen), or an R* group from Z* and an R* group from Y form a ring system.,
and n is 1 or 2 depending on the valence of M.

Examples of suitable monocyclopentadienyl complexes are (tert-butylamido) dimethyl (tetramethyl-$\eta^5$-cyclopentadienyl) silanetitanium dichloride and (2-methoxyphenylamido) dimethyl (tetramethyl-$\eta^5$-cyclopentadienyl) silanetitanium dichloride.

Other suitable monocyclopentadienyl complexes are those comprising phosphinimine ligands described in WO 99/40125, WO 00/05237, WO 00/05238 and WO00/32653. A typical examples of such a complex is cyclopentadienyl titanium [tri (tertiary butyl) phosphinimine] dichloride.

Another type of polymerisation catalyst suitable for use in the present invention are monocyclopentadienyl complexes comprising heteroallyl moieties such as zirconium (cyclopentadienyl) tris (diethylcarbamates) as described in U.S. Pat. No. 5,527,752 and WO 99/61486.

Particularly preferred metallocene complexes for use in the preparation of the supported catalysts of the present invention may be represented by the general formula:

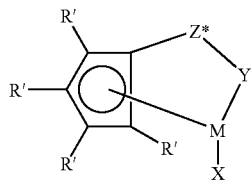

wherein:
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;
X is a neutral $\eta^4$ bonded diene group having up to 30 non-hydrogen atoms, which forms a $\pi$-complex with M;
Y is —O—, —S—, —NR*—, —PR*—,
M is titanium or zirconium in the 4-2 formal oxidation state;
Z* is SiR*$_2$, CR*$_2$, SiR*$_2$SIR*$_2$, CR*$_2$CR*$_2$, CR*=CR*, CR*$_2$SIR*$_2$, or
GeR*$_2$, wherein:
R* each occurrence is independently hydrogen, or a member selected from hydrocarbyl, silyl, halogenated alkyl, halogenated aryl, and combinations thereof, said
R* having up to 10 non-hydrogen atoms, and optionally, two R* groups from Z* (when R* is not hydrogen), or an R* group from Z* and an R* group from Y form a ring system.

Examples of suitable X groups include s-trans-$\eta^4$-1,4-diphenyl-1,3-butadiene; s-trans-$\eta^4$-3-methyl-1,3-pentadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene, said s-cis diene group forming a $\pi$-complex as defined herein with the metal.

Most preferably R' is hydrogen, methyl, ethyl, propyl, butyl, pentyl, hexyl, benzyl, or phenyl or 2 R' groups (except hydrogen) are linked together, the entire $C_5R'_4$ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R")- or —P(R")- wherein R" is $C_{1-10}$ hydrocarbyl.

Most preferred complexes are amidosilane—or amidoalkanediyl complexes.

Most preferred complexes are those wherein M is titanium.

Specific complexes suitable for use in the preparation of the supported catalysts of the present invention are those disclosed in WO 95/00526 and are incorporated herein by reference.

A particularly preferred complex for use in the preparation of the supported catalysts of the present invention is (t-butylamido) (tetramethyl-$\eta^5$-cyclopentadienyl) dimethyl silanetitanium-$\eta^4$-1.3-pentadiene.

The loading (transition metal) in the supported catalysts of the present invention is typically in the range 0.1 $\mu$mol/g to 1 mmol/g.

Thus according to a preferred embodiment of the present invention there is provided the preparation of a supported metallocene catalyst system said method comprising the combination of
(v) a porous support
(vi) a polymerisable monomer,
(vii) a metallocene complex, and
(viii) a cocatalyst, characterised in that the polymerisable monomer is added to the porous support before addition of one or both of the metallocene complex and the cocatalyst.

Suitable cocatalysts for use in the method of the present invention are those typically used with the aforementioned polymerisation catalysts.

These include aluminoxanes such as methyl aluminoxane (MAO), boranes such as tris(pentafluorophenyl) borane and borates.

Aluminoxanes are well known in the art and preferably comprise oligomeric linear and/or cyclic alkyl aluminoxanes. Aluminoxanes may be prepared in a number of ways and preferably are prepare by contacting water and a trialkylaluminium compound, for example trimethylaluminium, in a suitable organic medium such as benzene or an aliphatic hydrocarbon.

A preferred aluminoxane is methyl aluminoxane (MAO).

Other suitable cocatalysts are organoboron compounds in particular triarylboron compounds. A particularly preferred triarylboron compound is tris(pentafluorophenyl) borane.

Other compounds suitable as cocatalysts are compounds which comprise a cation and an anion. The cation is typically a Bronsted acid capable of donating a proton and the anion is typically a compatible non-coordinating bulky species capable of stabilizing the cation.

Such cocatalysts may be represented by the formula:

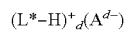

wherein
L* is a neutral Lewis base
$(L^*-H)^+_d$ is a Bronsted acid
$A^{d-}$ is a non-coordinating compatible anion having a charge of d−, and
d is an integer from 1 to 3.

The cation of the ionic compound may be selected from the group consisting of acidic cations, carbonium cations, sylium cations, oxonium cations, organometallic cations and cationic oxidizing agents.

Suitably preferred cations include trihydrocarbyl substituted ammonium cations eg. triethylammonium, tripropylammonium, tri(n-butyl)ammonium and similar; Also suitable are N.N-dialkylanilinium cations such as N,N-dimethylanilinium cations.

The preferred ionic compounds used as cocatalysts are those wherein the cation of the ionic compound comprises a hydrocarbyl substituted ammonium salt and the anion comprises an aryl substituted borate.

Typical borates suitable as ionic compounds include:
triethylammonium tetraphenylborate
triethylammonium tetraphenylborate,
tripropylammonium tetraphenylborate,
tri(n-butyl)ammonium tetraphenylborate,
tri (t-butyl)ammonium tetraphenylborate,
N,N-dimethylanilinium tetraphenylborate,
N,N-diethylanilinium tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate.

A preferred type of cocatalyst suitable for use with the metallocene complexes of the present invention comprise ionic compounds comprising a cation and an anion wherein the anion has at least one substituent comprising a moiety having an active hydrogen.

Suitable cocatalysts of this type are described in WO98/27119 the relevant portions of which are incorporated herein by reference.

Examples of this type of anion include:
triphenyl(hydroxyphenyl)borate
tri (p-tolyl)(hydroxyphenyl)borate
tris (pentafluorophenyl)(hydroxyphenyl)borate
tris (pentafluorophenyl)(4-hydroxyphenyl)borate Examples of suitable cations for this type of cocatalyst include triethylammonium, triisopropylammonium, diethylmethylammonium, dibutylethylammonium and similar.

Particularly suitable are those cations having longer alkyl chains such as dihexyldecylmethylammonium, dioctadecylmethylammonium, ditetradecylmethylammonium, bis(hydrogentated tallow alkyl) methylammonium and similar.

Particular preferred cocatalysts of this type are alkylammonium tris(pentafluorophenyl) 4-(hydroxyphenyl) borates. A particularly preferred cocatalyst is bis(hydrogenated tallow alkyl) methyl ammonium tris (pentafluorophenyl) (4-hydroxyphenyl) borate.

With respect to this type of cocatalyst, a preferred compound is the reaction product of an alkylammonium tris(pentaflurophenyl)-4-(hydroxyphenyl) borate and an organometallic compound, for example triethylaluminium.

The preferred metal with respect to the organometallic compound is aluminium and the preferred metal for the ionic activator is boron whereby the molar ratio of Al/B is less than 2 and is preferably less than 1 and most preferably in the range 0.3 to 0.8.

In a preferred method according to the present invention the molar ratio of metallocene complex to cocatalyst employed in the method of the present invention may be in the range 1:10000 to 100:1. A preferred range is from 1:5000 to 10:1 and most preferred from 1:10 to 10:1.

It is advantageous in this method of the present invention that the ionic compound is dried before contact with the organometallic compound. This enables lower ratios of organometallic compound to the ionic compound to be used without any detrimental effects on activity.

The supported catalyst systems of the present invention are most suitable for operation in processes which typically employ supported polymerisation catalysts.

The supported catalysts of the present invention may be suitable for the polymerisation of olefin monomers selected from (a) ethylene, (b) propylene (c) mixtures of ethylene and propylene and (d) mixtures of (a), (b) or (c) with one or more other alpha-olefins.

Thus according to another aspect of the present invention there is provided a process for the polymerisation of olefin monomers selected from (a) ethylene, (b) propylene (c) mixtures of ethylene and propylene and (d) mixtures of (a), (b) or (c) with one or more other alpha-olefins, said process performed in the presence of a supported polymerisation catalyst system as hereinbefore described.

The supported systems of the present invention are however most suitable for use in slurry or gas phase processes.

A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 200° C. but preferably from about 60° C. to 100° C. Loop reactors are widely used in slurry polymerisation processes.

Gas phase processes for the polymerisation of olefins, especially for the homopolymerisation and the copolymerisation of ethylene and α-olefins for example 1-butene, 1-hexene, 4-methyl-1-pentene are well known in the art.

Typical operating conditions for the gas phase are from 20° C. to 100° C. and most preferably from 40° C. to 85° C. with pressures from subatmospheric to 100 bar.

Particularly preferred gas phase processes are those operating in a fluidised bed. Examples of such processes are described in EP 89691 and EP 699213 the latter being a particularly preferred process for use with the supported catalysts of the present invention.

Particularly preferred polymerisation processes are those comprising the polymerisation of ethylene or the copolymerisation of ethylene and α-olefins having from 3 to 10 carbon atoms.

Thus according to another aspect of the present invention there is provided a process for the polymerisation of ethylene or the copolymerisation of ethylene and α-olefins having from 3 to 10 carbon atoms, said process performed under polymerisation conditions in the present of a supported catalyst system prepared as hereinbefore described.

The preferred α-olefins are 1-butene, 1-hexene, 4-methyl-1-pentene and 1-octene.

The supported catalysts prepared according to the present invention may also be suitable for the preparation of other polymers for example polypropylene, polystyrene, etc.

By use of the method of the present invention a free flowing powder is produced which typically may have a similar particle size to the starting porous support material. The resultant supported catalysts are stable at room temperature over extended periods of time and exhibit a less deactivating kinetic profile than similar catalysts prepared without the incorporation of a polymerisable monomer.

It is also an advantage of the method of the present invention that supported catalysts may be suitably prepared in a one-pot procedure ie. a preparation carried out without the need for washing steps and typically wherein the contact between the support material, cocatalyst, polymerisation catalyst and monomer is performed in a single reaction vessel.

The present invention will now be further illustrated with reference to the following examples:

Abbreviations
TEA triethylaluminium
TiBA triisobutylaluminium
Ionic Compound A $[N(H)Me(C_{18-22}H_{37-45})_2][B(C_6F_5)_3(C_6H_4OH)]$
Complex A $(C_5Me_4SiMe_2, N^1Bu)Ti(\eta^4\text{-}1,3\text{-pentadiene})$

EXAMPLE 1

To 10 Kg of silica Grace-Davison 948 (previously calcined at 250° C. for 5 hours) in 110 litres of hexane was added 18.3 litres of 1000 mMAl/litre of TEA in hexane. After 2 hours stirring at 30° C. the silica was washed with 130 litres hexane and dried under vacuum. The concentration of aluminium on the solid was found to be 1.36 mmol/g.

EXAMPLE 2

To 2.31 ml (0.171 mmol) of a toluene solution of Ionic Compound A (9.7% wt) was added 0.41 ml (0.103 mmol) of a toluene solution of TEA ([Al]=0.25 mol/l). This solution as the added to 3.2 g of TEA treated silica (Grace-Davison 948, [Al]=1.36 mmol/g) prepared according to Example 1 and the mixture was well agitated until non lumps were visible and was allowed to stand for 30 min. 0.71 ml of 1-hexene was the added and after 30 minutes of agitation 0.98 ml (0.163 mmol) of an heptane solution of Complex A (8.57% wt) was then impregnated. The mixture was well agitated until no lumps were visible, was allowed to stand for 30 min and finally dried under vacuum.
[Al]=1.12 mmol/g
[Ti]=45.8 μmol/g

EXAMPLE 3

To 12 g of silica ES70 (previously calcined at 500° C. for 5 hours) in 100 ml of hexane was added 19.2 ml of 1 mol/l solution of TEA in hexane. After 2 hours reaction, the silica was washed 3 times with 100 ml hexane and dried under vacuum.

To 2.36 (0.175 mmol) ml of a toluene solution of Ionic Compound A (9.7% wt) was added 0.42 ml (0.103 mmol) of a toluene solution of TEA ([Al]=0.25 mol/l). This solution was the added to 3.2 g of above TEA treated ES70silica and the mixture was well agitated until non lumps were visible and was allowed to stand for 30 min. 0.63 ml of 1-hexene was the added and after 30 minutes of agitation 1 ml (0.166 mmol) of a heptane solution of Complex A (8.58% wt) was then impregnated. The mixture was well agitated until no lumps were visible, allowed to stand for 30 min and finally dried under vacuum.

[Al]=0.92 mmol/g
[Ti]=45.8 μmol/g

EXAMPLE 4 POLYMERISATION DATA

The catalysts from Examples 2 and 3 were tested for ethylene—1-hexene copolymerisation as follows:

A 2.5 l double jacketed thermostatic stainless steel autoclave was purged with nitrogen at 70° C. for at least one hour. 150 g of PE pellets previously dried under vacuum at 80° C. for 12 hours were introduced and the reactor was then purged three times with nitrogen (7 bar to atmospheric pressure). ~0.13 g of TEA treated silica (1.5 mmol TEA/g) was added under pressure and allowed to scavenge impurities for at least 15 minutes under agitation. The gas phase was then composed (addition of ethylene, 1-hexene and hydrogen) and a mixture of supported catalyst (~0.1 g) and silica/TEA (~0.1 g) was injected. A constant pressure of ethylene and a constant pressure ratio of ethylene/co-monomer were maintained during the run. The run was terminated by venting the reactor and then purging the reactor 3 times with nitrogen. The PE powder produced during the run was then separated from the PE seed bed by simple sieving.

Typical conditions are as follows:
Temperature: 70° C.
Ethylene pressure: 6.5b
P(1-hexene)/P(ethylene): 0.004-0.008
Hydrogen: 70-100 ml added during the gas phase composition

| Catalyst | Average Activity (g/g · h · bar) | Peak Activity (g/g · h · bar) | Activity at 1 h (g/g · h · bar) | Activity at 3 h (g/g · h · bar) |
|---|---|---|---|---|
| Example 2 | 76.4 | 180 | 121 | 40 |
| Example 3 | 87.5 | 300 | 155 | 37 |

These examples clearly show that catalysts with 1-hexene treatments are highly active for ethylene polymerisation with a reasonable peak activity and a slow activity decay profile. After 3 hour runs the catalysts still present substantial activity level.

EXAMPLE 5

To 2.44 ml (0.181 mmol) of a toluene solution of Ionic Compound A was added 0.72 ml (0.181 mmol) of a toluene solution of TEA ([Al]=0.25 mol/l). This solution was the added to 3.0 g of TEA treated silica (Grace 948, [Al]=1.36 mmol/g) and the mixture was well agitated until non lumps were visible and was allowed to stand for 30 min.

0.75 ml of 1-hexene was the added and after 30 minutes of agitation 1.0 ml (0.169 mmol) of a heptane solution of Complex A (8.57% wt) was then impregnated. The mixture was well agitated until no lumps were visible, was allowed to stand for 30 min and finally dried under vacuum.

[Al]=1.18 mmol/g
[Ti]=45.1 μmol/g

EXAMPLE 6 (COMPARATIVE)

To 2.114 ml (0.156 mmol) of a toluene solution of Ionic Compound A (9.7% wt) was added 0.63 ml (0.156 mmol) of a toluene solution of TEA ([Al]=0.25 mol/l). This solution was the added to 3.0 g of TEA treated silica (Grace 948, [Al]=1.36 mmol/g) and the mixture was well agitated until non lumps were visible and was allowed to stand for 30 min.

0.87 ml (0.146 mmol) of a heptane solution of Complex A (8.57% wt) was then impregnated. The mixture was well agitated until no lumps were visible and was allowed to stand for 30 min. Three washes were performed with 3*30 ml of hexane and the catalyst was finally dried under vacuum.

[Al]=1.32 mmol/g
[Ti]=38 μmol/g

EXAMPLE 7 POLYMERISATION DATA

The catalysts prepared in Examples 5 and 6 were tested for ethylene—1-hexene copolymerisation as described in Example 4. Run time was 1 hour.

| Catalyst | Average Activity (g/g · h · bar) | Peak activity (g/g · h · bar) |
|---|---|---|
| Example 5 | 90 | 170 |
| Example 6 (comparative) | 85 | 300 |

Examples 5 and 6 clearly show a less deactivating kinetic profile with the catalyst of the invention than a similar catalyst prepared without the incorporation of a polymerisable monomer.

EXAMPLE 8

To 10 g of silica ES70 (previously calcined at 500° C. for 5 hours) in 50 ml of hexane was added 15 ml of 0.95 mmol/l solution of TiBA in hexane. After 2 hours reaction, the silica was washed 3 times with 100 ml hexane and dried under vacuum. To 2.16 (0.16 mmol) ml of a toluene solution of Ionic Compound A (9.7% wt) was added 0.66 ml (0.18 mmol) of a toluene solution of TiBA ([Al]=0.265 mmol/l). This solution was the added to 3 g of above TiBA treated ES70 silica and the mixture was well agitated until non lumps were visible and was allowed to stand for 30 min. 0.47 ml of 1-hexene was the added and after 30 minutes of agitation 3.03 ml (0.11 mmol) of a toluene solution of rac ethylene bis (indenyl) zirconocene 1.4-diphenyl butadiene (1.48% wt) was then impregnated. The mixture was well agitated until no lumps were visible, allowed to stand for 30 min and finally dried under vacuum.

[Al]=0.77 mmol/g
[Ti]=28 μmol/g

EXAMPLE 9 POLYMERISATION DATA

The catalyst prepared in Example 8 was tested for ethylene—1-hexene copolymerisation as described in Example 4. Run time was 1 hour and the activity was 60 g/ghb with a slowly decaying profile.

EXAMPLE 10

To 30 g of Ineos ES70 silica (previously calcined at 500° C. for 5 hrs. under nitrogen, pore volume 1.55 ml/g) was added a solution made with 28.13 ml of a hexane solution of TiBA (0.96 mol/l), and 18.38 ml of hexane. The mixture was allowed to react for 2.5 hrs under agitation then dried under vacuum.

15.06 ml of a toluene solution of Ionic Compound A (previously dried by prolonged contact with molecular sieves 4A) was reacted with 2.41 ml of TiBA solution in toluene (0.265 mol/l)(molar ratio of TiBA/ionic compound=0.5 i.e. Al/B ratio=0.5)

17.47 ml of the resultant solution vas slowly impregnated (15 min) to the above TiBA treated silica and manually agitated until no lumps were visible.

10 ml of 1-hexene were slowly impregnated (5 min) to the above solution and manually agitated until no lumps were visible followed by holding for 30 mins.

7.16 ml of Complex A in heptane (9.17% wt) were then slowly added (15 min) and manually agitated until no lumps were visible followed by holding for 1 hr.

The catalyst was then dried under reduced pressure to give a loading of [Ti] 40 µmol/g.

EXAMPLE 11 POLYMERISATION DATA

The catalyst prepared in Example 10 was tested for ethylene-1-hexene copolymerisation as described in Example 4 except that 260 gram of NaCl was used as a seed bed instead of PE pellets. Run time was 1 hour and the activity was 97 g/ghb with a slowly decaying profile. After 30 min of polymerization the instantaneous catalyst activity was still at 70 g/ghb.

EXAMPLE 12

To 2.015 (0.171 mmol) of a toluene solution of Ionic Compound A (9.7% wt) was added 0.41 ml (0.103 mmol) of a toluene solution of TEA ([Al]=0.25 mol/l). This solution was then added to 3.0 g of TEA treated silica (Grace-Davison 948, [Al]=1.36 mmol/g) and the mixture was well agitated until no lumps were visible and was allowed to stand for 30 min.

0.72 ml of 1-decene was then added and after 30 minutes of agitation 0.91 ml (0.163 mmol) of a heptane solution of CGC7 (8.57% wt) was then impregnated. The mixture was well agitated until no lumps were visible, was allowed to stand for 30 min and finally dried under vacuum.

[Al]=1.08 mmol/g
[Ti]=58.3 µmol/g

EXAMPLE 13 POLYMERISATION DATA

The catalyst from Example 12 was tested for ethylene—1-hexene copolymerisation as described in Example 4. Run time was 1 hour and the activity was 108 g/ghb with a slowly decaying profile.

EXAMPLE 14

A copolymerisation of ethylene and 1-hexene was carried out using a catalyst prepared in a similar manner to that described in Example 2 in a gas phase fluidised bed reactor of diameter 0.74 metres and a bed height of approximately 5-6 metres. The catalyst had a titanium loading of 45 µmol/g and a B/Ti ratio of 1.07.

The process conditions were as follows:

| | |
|---|---|
| Total Pressure (bar) | 20 |
| Temperature (° C.) | 83 |
| Ethylene Pressure (Bar) | 13.5 |
| Pentane (bar) | 1 |
| Stadis 425 (ppm)* | 10 |
| $H_2/C_2$ ratio | 0.0022 |
| $C_6/C_2$ ratio | 0.005 |
| Production (kg/hr) | 140 |
| Productivity (gPE/g catalyst) | 4700 |

*Stadis 425 is available from Associated Octel and is expressed in ppm relative to the ethylene feed The resultant copolymer had the following properties:

| | |
|---|---|
| Annealed density (kg/m³) | 919.4 |
| MI 2.16 (g/10 ml) | 1.25 |
| MFR (21.6/2.16) | 20.6 |
| Mw | 103147 |
| Mn | 34918 |
| Mw/Mn | 3.0 |

The invention claimed is:

1. A method for the preparation of a supported polymerisation catalyst system, said method comprising combining
   (i) a porous support,
   (ii) a polymerisable monomer,
   (iii) a metallocene complex having the formula:
   CnMXn
   wherein Cp is a single cyclopentadienyl or substituted cyclopentadienyl group optionally covalently bonded to M through a substituent, M is a Group IVB metal bound in a $\eta^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl. amidoalkyl, and siloxyalkyl having up to 20 non-hydrogen atoms and neutral Lewis base ligands having up to 20 non-hydrogen atoms or optionally one X together with Cp forms a metallocycle with M and n is dependent upon the valency of the metal, and
   (iv) a cocatalyst,
   wherein
   (i) to (iv) are combined in the order of
      (a) addition of the cocatalyst to the porous support,
      (b) addition of the polymerisable monomer, and
      (c) addition of the metallocene complex.

2. A method according to claim 1 wherein the polymerisable monomer is selected from the group consisting of ethylene, propylene, 1-butene and 1-hexene.

3. A method according to claim 1 wherein the polymerisable monomer is added to the porous support at 0.01-2 times the pore volume of the support.

4. A method according to claim 1 wherein the porous support is silica.

5. A method according to claim 4 wherein the silica is pretreated with an organometallic compound.

6. A method according to claim 1 wherein the cocatalyst is an aluminoxane.

7. A method according to claim 1 wherein the cocatalyst has the general formula:

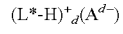

wherein
L* is a neutral Lewis base
(L*-H)$^+_d$ is a Bronsted acid
A$^{d-}$ is a non-coordinating compatible anion having a charge of d⁻, and
d is an integer from 1 to 3.

8. A method according to claim 7 wherein the cocatalyst comprises a cation and an anion wherein the anion has at least one substituent comprising a moiety having an active hydrogen.

9. A process for the polymerisation of olefin monomers selected from the group consisting of (a) ethylene, (b) propylene (c) mixtures of ethylene and propylene and (d) mixtures of (a), (b) or (c) with one or more other alpha-olefins, said process being performed in the presence of a supported polymerisation catalyst system prepared according to the method of claim 1.

10. A process for the polymerisation of ethylene or the copolymerisation of ethylene and a-olefins having from 3 to 10 carbon atoms, said process being performed under polymerisation conditions in the presence of a supported polymerisation catalyst system prepared according to the method of claim 1.

11. A process according to claim 10 wherein the α- olefin is 1-butene, 1-hexene, 4-methyl-1-pentene or 1-octene.

12. A process according to any one of claims 9 to 11 performed in the solution, slurry or gas phase.

13. A process according to any one of claims 9 to 11 performed in a fluidised bed gas phase reactor.

14. A method for the preparation of a supported polymerisation catalyst system, said method comprising combining
(i) a porous support,
(ii) a polymerisable monomer,
(iii) a metallocene complex having the general formula:

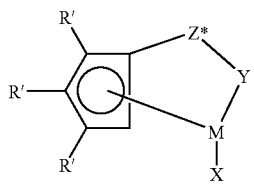

wherein:
R' each occurrence is independently selected from hydrogen, hydrocarbyl, silyl, germyl, halo, cyano, and combinations thereof, said R' having up to 20 non-hydrogen atoms, and optionally, two R' groups (where R' is not hydrogen, halo or cyano) together form a divalent derivative thereof connected to adjacent positions of the cyclopentadienyl ring to form a fused ring structure;
X is a neutral η$^4$ bonded diene group having up to 30 non-hydrogen atoms, which forms a π-complex with M;
Y is —O—, —S—, —NR*—, —PR*—,
M is titanium or zirconium in the +2 formal oxidation state;
Z* is SiR*$_2$, CR*$_2$, SiR*$_2$, SIR*$_2$, CR*$_2$CR*$_2$, CR*=CR*, CR*$_2$SIR*$_2$, or GeR*$_2$, wherein:
R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system, and
(iv) a cocatalyst,
wherein
(i) to (iv) are combined in the order of
(a) addition of the cocatalyst to the porous support,
(b) addition of the polymerisable monomer, and
(c) addition of the metallocene complex.

15. A method according to claim 14 wherein the polymerisable monomer is selected from the group consisting of ethylene, propylene, 1-butene and 1-hexene.

16. A method according to claim 14 wherein the polymerisable monomer is added to the porous support at 0.01-2 times the pore volume of the support.

17. A method according to claim 14 wherein the porous support is silica.

18. A method according to claim 17 wherein the silica is pretreated with an organometallic compound.

19. A method according to claim 14 wherein the cocatalyst is an aluminoxane.

20. A method according to claim 14 wherein the cocatalyst has the general formula:
(L*-H)+$_d$(A$^{d-}$)
wherein
L* is a neutral Lewis base
(L*-H)+$_d$ is a Bronsted acid
A$^{d-}$ is a non-coordinating compatible anion having a charge of d⁻, and
d is an integer from 1 to 3.

21. A method according to claim 20 wherein the cocatalyst comprises a cation and an anion wherein the anion has at least one substituent comprising a moiety having an active hydrogen.

22. A process for the polymerisation of olefin monomers selected from the group consisting of (a) ethylene, (b) propylene (c) mixtures of ethylene and propylene and (d) mixtures of (a), (b) or (c) with one or more other alpha-olefins, said process being performed in the presence of a supported polymerisation catalyst system prepared according to the method of claim 14.

23. A process for the polymerisation of ethylene or the copolymerisation of ethylene and α-olefins having from 3 to 10 carbon atoms, said process being performed under polymerisation conditions in the presence of a supported polymerisation catalyst system prepared according to the method of claim 14.

24. A process according to claim 23 wherein the α-olefin is 1-butene, 1-hexene, 4-methyl-1-pentene or 1-octene.

25. A process according to any one of claims 22 to 24 performed in the solution, slurry or gas phase.

26. A process according to any one of claims 22 to 24 performed in a fluidised bed gas phase reactor.

* * * * *